US010979207B1

(12) United States Patent
Geng et al.

(10) Patent No.: US 10,979,207 B1
(45) Date of Patent: Apr. 13, 2021

(54) TIME-BASED PROCESSING OF MESSAGES ARRIVING FROM MULTIPLE GATEWAYS USING GATEWAY-BASED TIME PERIMETERS

(71) Applicant: Tick Tock Networks, Inc., Palo Alto, CA (US)

(72) Inventors: Yilong Geng, Menlo Park, CA (US); Deepak Merugu, Sunnyvale, CA (US); Balaji S. Prabhakar, Palo Alto, CA (US)

(73) Assignee: Tick Tock Networks, Inc., Palo Alto, CA (US)

( * ) Notice: Subject to any disclaimer, the term of this patent is extended or adjusted under 35 U.S.C. 154(b) by 0 days.

(21) Appl. No.: 16/581,171

(22) Filed: Sep. 24, 2019

(51) Int. Cl.
*H04L 29/08* (2006.01)
*H04L 12/66* (2006.01)
*H04J 3/06* (2006.01)
*G06F 15/16* (2006.01)
*H04L 7/00* (2006.01)
*H04L 12/26* (2006.01)

(52) U.S. Cl.
CPC ............ *H04L 7/0008* (2013.01); *H04L 12/66* (2013.01); *H04L 43/106* (2013.01); *H04L 43/12* (2013.01)

(58) Field of Classification Search
CPC ..... H04L 7/0008; H04L 7/0012; H04L 12/66; H04L 43/106; H04L 43/12
USPC ........................................................ 709/248
See application file for complete search history.

(56) References Cited

U.S. PATENT DOCUMENTS

| 6,763,032 B1* | 7/2004 | Rabenko ............... H04L 1/0003 370/442 |
| 7,088,677 B1 | 8/2006 | Burst, Jr. |
| 2010/0161716 A1* | 6/2010 | Kajos ................. H04N 21/2662 709/203 |

(Continued)

FOREIGN PATENT DOCUMENTS

WO    WO 2009/117455 A2    9/2009

OTHER PUBLICATIONS

Yilong Geng et al., "Exploiting a Natural Network Effect for Scalable, Fine-grained Clock Synchronization," Apr. 2018, Proceedings of the 15th USENIX Symposium on Networked Systems Design and Implementation (NSDI '18), www.usenix.org/system/files/conference/nsdi18/nsdi18-geng.pdf (Year: 2018).*

(Continued)

*Primary Examiner* — Ruolei Zong
(74) *Attorney, Agent, or Firm* — Fenwick & West LLP

(57) ABSTRACT

Systems and methods are disclosed herein for performing a time-ordered operation on messages transmitted from multiple sources to a region of networked machines. In an embodiment, the system runs a software-based synchronization process to synchronize each of a plurality of gateways with a reference clock, where each gateway is a machine on a perimeter of the region of networked machines and is connected to receive messages from multiple sources. The system receives messages that enter the region through one of the gateways, where the gateway timestamps the message. The system then performs the time-ordered operation on the received messages in an order based on an absolute time of entry into the region, where the absolute time of entry is relative to the reference clock and is determined based on the timestamp from the gateway.

19 Claims, 11 Drawing Sheets

(56) References Cited

U.S. PATENT DOCUMENTS

| | | | |
|---|---|---|---|
| 2010/0191525 A1* | 7/2010 | Rabenko | H04L 7/0029 |
| | | | 704/211 |
| 2011/0110360 A1* | 5/2011 | Fenwick | G06F 1/14 |
| | | | 370/350 |
| 2016/0080533 A1 | 3/2016 | Jeon et al. | |
| 2017/0289939 A1 | 10/2017 | Hreha et al. | |
| 2020/0034929 A1* | 1/2020 | Rao | G06F 9/546 |

OTHER PUBLICATIONS

PCT Invitation to Pay Additional Fees and, Where Applicable, Protest Fee, PCT Application No. PCT/US2020/042974, dated Sep. 29, 2020, two pages.

PCT International Search Report and Written Opinion, PCT Application No. PCT/US2020/042974, dated Dec. 8, 2020, 23 pages.

\* cited by examiner

800

| 810 Probe ID | 820 Transmitting Node | 830 Receiving Node | 840 Transmit Time | 850 Receive Time |
| --- | --- | --- | --- | --- |
| 1 (Reject) | A | B | T1 | T1 + TT |
| 2 (Reject) | A | B | T1 + δ | T1 + δ + TT + D |
| 3 (Reject) | A | B | T2 | T2 + TT + D |
| 4 (Reject) | A | B | T2 + δ | T2 + δ + TT |
| 5 (Coded Probe) | A | B | T3 | T3 + TT |
| 6 (Coded Probe) | A | B | T3 + δ | T3 + δ + TT |

δ = transmission time spacing
TT = transit time for one probe
D = Delay

FIG. 8

TIME-BASED PROCESSING OF MESSAGES ARRIVING FROM MULTIPLE GATEWAYS USING GATEWAY-BASED TIME PERIMETERS

TECHNICAL FIELD

This disclosure relates generally to ensuring messages received at multiple gateways are processed in a time-based order, notwithstanding that the sources of the messages may not be synchronized.

DESCRIPTION OF THE RELATED ART

Limits to clock synchronization accuracy between machines, such as gateways, impose practical limitations in many applications. For example, in finance and e-commerce, clock synchronization is crucial for determining transaction order, in that a trading platform must match bids and offers in the order in which those bids and offers are received at the gateways. If clocks of machines used to submit or route the bids and offers are not synchronized, then bids and offers may be matched out of order, which results in a lack of fairness. Financial exchanges attempt to mitigate the lack of fairness by calibrating placement of gateways, where messages are received and sequenced for processing, at equidistant locations with respect to the sources of bids and offers, so that messages travel roughly the same distance and thus have roughly the same transit time. However, notwithstanding this calibration, messages are still delivered out of sequence due to jitter, and practical constraints are imposed by having to physically place gateways at such calibrated distances to maintain fairness.

Similar problems occur in other networked computer systems, such as distributed databases, distributed ledgers (e.g., blockchains), distributed transaction tracing systems, distributed snapshotting of computation or networks, 5G mobile network communications, and so on. In these systems, limits on clock synchronization result in jitter, which results in biased or non-optimal processing of communications.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIG. 8 is a data structure diagram that illustrates probe records, and manners of identifying coded probes from the probe records, according to an embodiment of the disclosure.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Systems and methods are disclosed herein that ensure messages arriving from sources that pass through different gateways are processed in an order determined based on their timestamps at the different gateways as determined relative to a reference clock. This is the case even when the sources are not synchronized to the reference clock. The systems and methods may be software-based, thus avoiding a need to physically calibrate gateways to achieve this outcome, which is expensive, impractical, and imprecise. In this manner, fairness is achieved, as the messages will be processed in order without a need to synchronize the sources of the messages to the reference clock. To achieve such fairness, the gateways are synchronized to within a known time deviation of the reference clock that may be within an order of nanoseconds of the reference clock.

Figure 1:
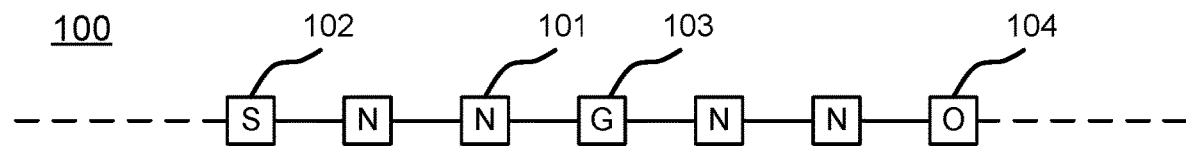
FIG. 1 is a representation of a pipeline for processing a message.

FIG. 1 is a representation of a pipeline for processing a message. Depicted in FIG. 1 are various machines, each serving a different function. In FIG. 1, the letter "N" stands for node. The term "node," as used herein, refers to any physical or virtual device through which a message originates, is processed and/or relayed, or to which a message is destined. Nodes may be machines in some embodiments. The term "machine" refers to any device that maintains a clock or produces timestamps, such as a physical or virtual machine, a server, a server blade, and the like. Each machine includes a local clock (e.g., as implemented in a computer processing unit (CPU) of a machine, or as implemented in a device that is operably coupled to a machine, such as a network interface card (NIC) of a machine). In FIG. 1, the letter "S" stands for source node. A source node is a node from which a message emanates. The source nodes may be under the control of users, companies, or other such entities that are different from entities controlling other machines in FIG. 1. The term message refers to any communication (e.g., a single packet, a collection of packets, and/or a single data unit or collection of data units) that is transmitted between nodes. Still with reference to FIG. 1, the letter "G" stands for gateway, and the letter "O" stands for time-ordered operation. The term "gateway" will be defined in detail with reference to FIG. 2 below, as will the term "time-ordered operation." Operator node 104 may be, for example, controlled by a financial exchange, or another central entity that does not control the source nodes. Pipeline 100 depicts an exemplary flow of a message from source node 102, through various machines 101, to gateway 103, through various other nodes 101, and finally to operator node 104 that performs a time-ordered operation on the message. Any number of machines, including no machines at all, may be placed between source node 102, gateway 103, and operator node 104. Moreover, while not depicted, the dashed lines in FIG. 1 preceding source node 102 and following node 104 indicate that further nodes may be placed within pipeline 100 prior to source 102 transmitting the message, and prior to the time-ordered operation being executed. While the lines are depicted as single communication paths, this is for illustrative convenience; there may be multiple paths between the blocks of FIG. 1.

Figure 2:
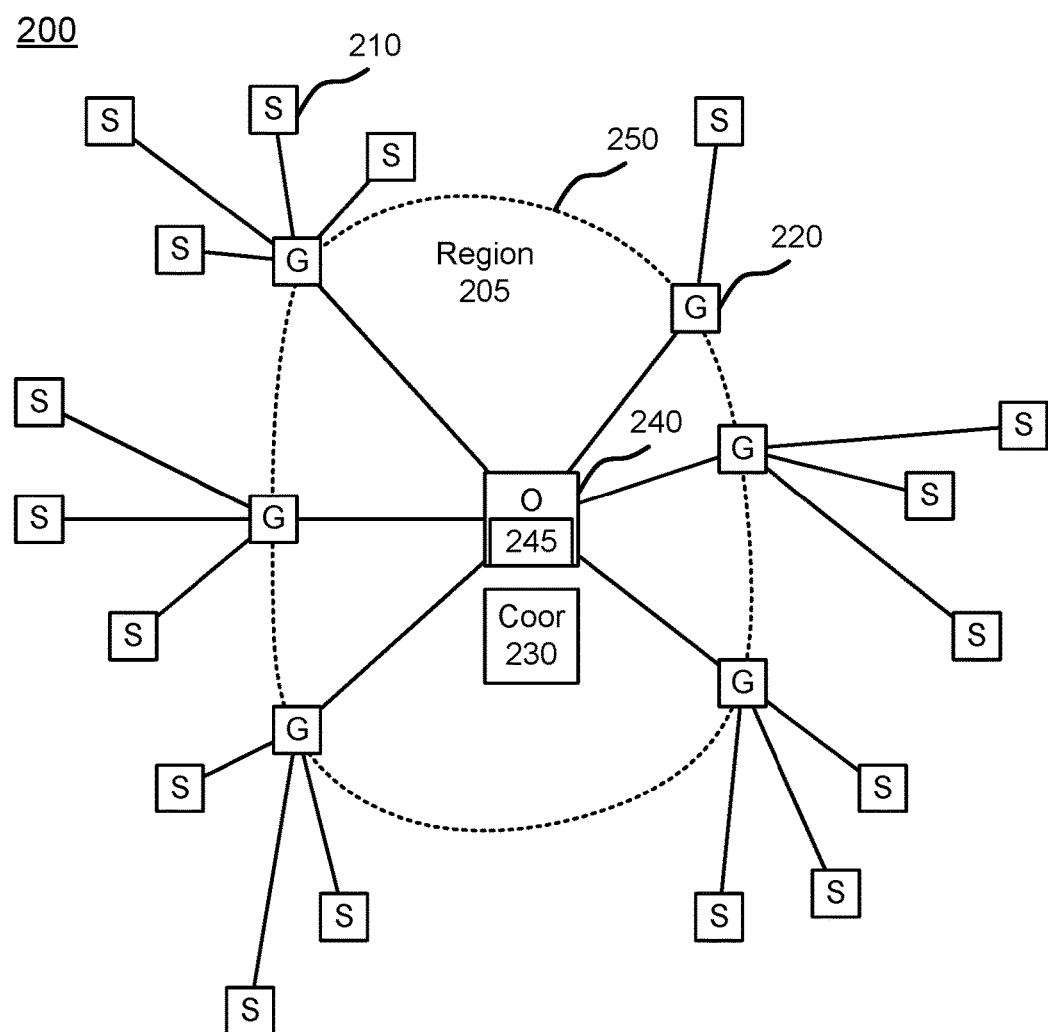
FIG. 2 is a graph of a network of machines, according to an embodiment of the disclosure.

FIG. 2 is a graph of a network of machines, according to an embodiment of the disclosure. Network 200 includes source nodes 210 and gateways 220, as well as coordinator 230 and operator node 240. Operator node 240, as illustrated, includes reference clock 245. Reference clock 245 may be within any machine and need not be part of operator node 240. Network 200 may include additional nodes, mentioned above with reference to FIG. 1, even though those nodes are not depicted in FIG. 2. Source nodes 210 transmit messages through gateways 220 to operator node 240 for time-ordered processing. Gateways 220 are synchronized to reference clock 245 of operator node 240, such that timestamps applied by gateways 220 to the messages from source nodes 210 are absolute with respect to reference clock 245. In an embodiment, reference clock 245 is within a machine other than operator node 240. Gateways 220 apply a timestamp to messages received from source nodes 210 (e.g., to indicate a time at which each message was received by the gateways 220, to indicate a time at which the message was processed by the gateways 220, to indicate a transmit time of the message from the gateways 220, etc.), and then transmit the messages to operator node 240. Coordinator 230 coordinates the synchronization between gateways 220 and operator node 240, the synchronization process being described in further detail with reference to FIGS. 6-11 below. Operator node 240 performs a time-ordered operation on the receives messages. For example, it may first reorder the messages based on the gateway timestamps, and then perform the operation on the time-ordered messages. Time-ordered operations are defined and described in further detail with reference to FIGS. 3-4 below.

Gateways 220 form time perimeter 250. In an embodiment, time perimeter 250 is a logical boundary, where gateways along time perimeter 250 are synchronized to reference clock 245. In an embodiment (e.g., in a financial exchange scenario), machines along or within time perimeter 250 (i.e., machines within region 205) may be synchronized to reference clock 245, and machines outside region 205 may or may not be synchronized to reference clock 245. In an embodiment, source nodes 210 themselves may be synchronized to reference clock 245 if they are instructed by coordinator 230 to synchronize to reference clock 245.

Figure 3:
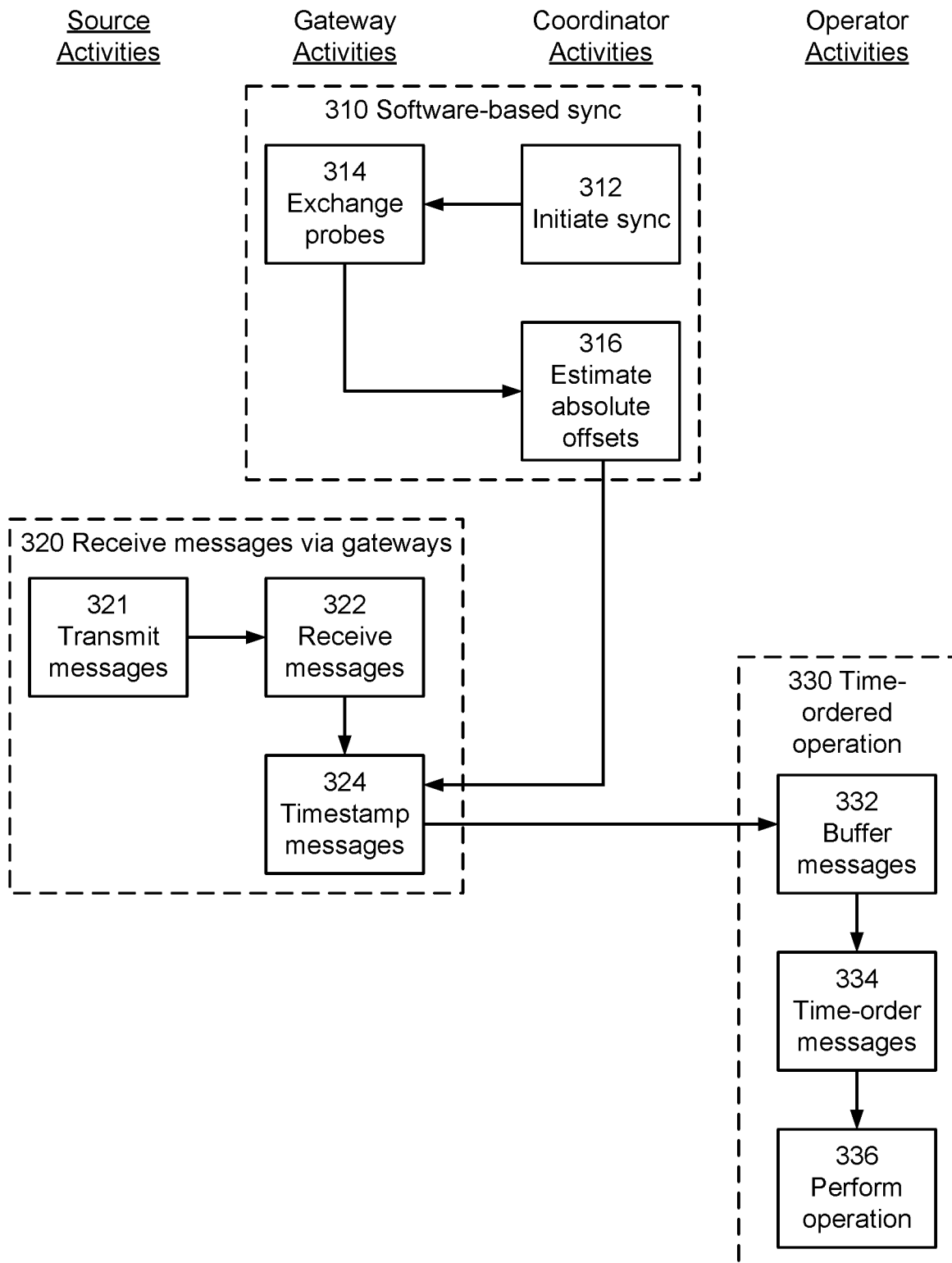
FIG. 3 is a flow diagram for performing a time-ordered operation on messages, according to an embodiment of the disclosure.

FIG. 3 is a flow diagram for performing a time-ordered operation on messages, according to an embodiment of the disclosure. FIG. 3 includes four columns for source activities, gateway activities, coordinator activities and operator activities. In this example, a box which appears in a column is performed by the corresponding entity. Flow 300 begins with sub process 310, which establishes software-based synchronization. In brief, software-based synchronization 310 begins with a coordinator (e.g., coordinator 230) initiating 312 a synchronization operation on a set of machines that includes one or more gateways (e.g., gateways 220) and a reference machine (e.g., operator node 240, which includes reference clock 245). The nodes (including the gateways and reference machine) exchange 314 probes. As illustrated, the coordinator estimates 316 absolute offsets for each machine with respect to the reference clock of the reference machine based on the exchanged probes; however, in alternate embodiments, the gateways themselves may estimate the absolute offsets. Software-based synchronization, including exchange of probes, and estimating absolute offsets is described in further detail with respect to FIGS. 6-11 below. At the conclusion of software-based synchronization 310, the gateways (e.g., gateways 320) are synchronized to the reference clock.

Data flow 300 proceeds to sub process 320, which establishes a sub process for receiving messages via the time-synchronized gateways. Source nodes (e.g., source nodes 210) transmit 321 messages to the gateways on the time perimeter. The gateways receive 322 the messages, and timestamp 324 the messages, for example upon receipt. Thus, the gateway timestamps establish a time at which each message crosses the time perimeter. Because the gateways of the time perimeter are synchronized to the reference clock, the timestamps will enable the coordinator and/or operator to determine with certainty the time according to a given reference clock at which messages arrived at the time perimeter, even if the messages arrive at different gateways of the time perimeter. The timestamped messages are transmitted to the operator (e.g., operator node 240) for time-ordered processing.

After the timestamped messages are transmitted to the operator, data flow 300 continues to sub process 330, which performs a time-ordered operation on the messages. The term time-ordered operation refers to an operation performed on messages, in which the messages are processed in an order based on the gateway timestamps. In one approach, the messages may arrive at the operator out of order so the operator buffers 332 the timestamped messages as they are received. In an embodiment, the messages are buffered until the buffer is full, at which time the operator time-orders 334 the timestamped messages. Alternatively, the messages are buffered until a predefined amount of time has passed since a first message included in the buffer was received or are buffered until the end of a predefined period, at which time the operator time-orders 334 the time-stamped messages. Buffering the messages ensures that all messages received within a given period of time, even if affected by jitter, are time-ordered and not missed in the time-ordering (e.g., resequencing) process. Time-ordering 334 the messages includes ordering the messages in an order in which the messages were received within region 205. The messages may be time-ordered by physically re-ordering the messages within the buffer, by appending sequence numbers within the messages or within headers of the messages, generating a data structure with an ordered list of identifiers of the messages corresponding to the time order, or using any other means of establishing an order of the messages.

Time-ordering the messages may be in any order that is based on the gateway timestamps. For example, the messages may be processed in a chronological order of the absolute time entry of the messages at the perimeter (e.g., first-in-first-out or last-in-first-out, with respect to time of entry at the perimeter). As another example, the messages may be ordered by parameters in addition to the absolute time entry of the messages, such as factors that cause the absolute time entry to be weighted, such as importance of the message, tier of service, quality of service, and the like.

The time ordering may be based on the gateway through which the message entered the region. As an example, some gateways may be assigned a higher importance than other gateways, and operator node 240 may weight the absolute time entry based on the importance to prioritize message from those high importance gateways in a manner that causes the messages at the high importance gateways to be prioritized earlier than other messages even if these latter messages have an absolute time entry that is later than the other messages' absolute time entry.

In an embodiment, the messages received at a given gateway may be timestamped by the sources from which they originated, and jitter or other network conditions may cause the gateway timestamps to be inconsistent with an order in which the sources timestamped the messages. Such jitter may cause out-of-order processing where the sources are synchronized to one another. To eliminate issues caused by such jitter or other network issues, a gateway may itself have a buffer where it periodically receives messages from sources, orders them based on their source timestamp, and then includes signaling so that they are processed in the order from which they departed their sources, regardless of the gateway timestamp. For example, the gateway may modify its gateway timestamps to preserve an order, or may aggregate the messages into a single message including a same timestamp, so that the messages are processed by operator node 240 in order with respect to messages from other gateways according to the gateway timestamp, while their source order is preserved as well. Furthermore, hierarchical perimeters may be established, where messages are timestamped at each perimeter they cross. Operator node 240 may determine where each timestamp ranks in the hierarchy (e.g., based on database entries that rank the perimeters in the hierarchy) and may process the messages in accordance with the hierarchy. This is discussed in further detail below with respect to FIGS. 5A and 5B.

In an embodiment, a message is received by operator node 240 that has not passed through a time perimeter, and thus does not include a synchronized timestamp. When such messages are encountered, these messages may be time ordered by operator node 240 in ad hoc fashion (e.g., by operator node 240 timestamping the message, and timestamping messages received from gateways 220, and time ordering the messages based, in addition to the perimeter timestamps, on the timestamp applied by operator node 240).

After the messages are time-ordered, the operator performs 336 a time-ordered operation. Examples of data flow 300 and resulting time-ordered operations are as follows. As an example, where the gateways are part of a financial exchange, and the messages are financial orders received from sources that are multiple market participants placing orders through different gateways, the time-ordered operation may be to resolve the financial orders in temporal order, thus ensuring fairness. As another example, where the gateways are conduits for receipt of information in a multi-player real-time networked game, and the messages are game commands received from multiple players of the game at different gateways, the time-ordered operation may include advancing the game according to the temporal order of the game commands. Fairness is ensured in that, in a first-person shooter game for example, the user who, according to the reference clock, took a first shot at a target, is credited with that shot. As yet another example, where the messages are commands sent by multiple controllers to a robot over a network with random delays (e.g., in a manufacturing environment), the time-ordered operation may ensure that the robot acts on the commands in the order in which they were issued by the controllers at the time perimeter, regardless of the order in which they arrived at the robot.

Figure 4:
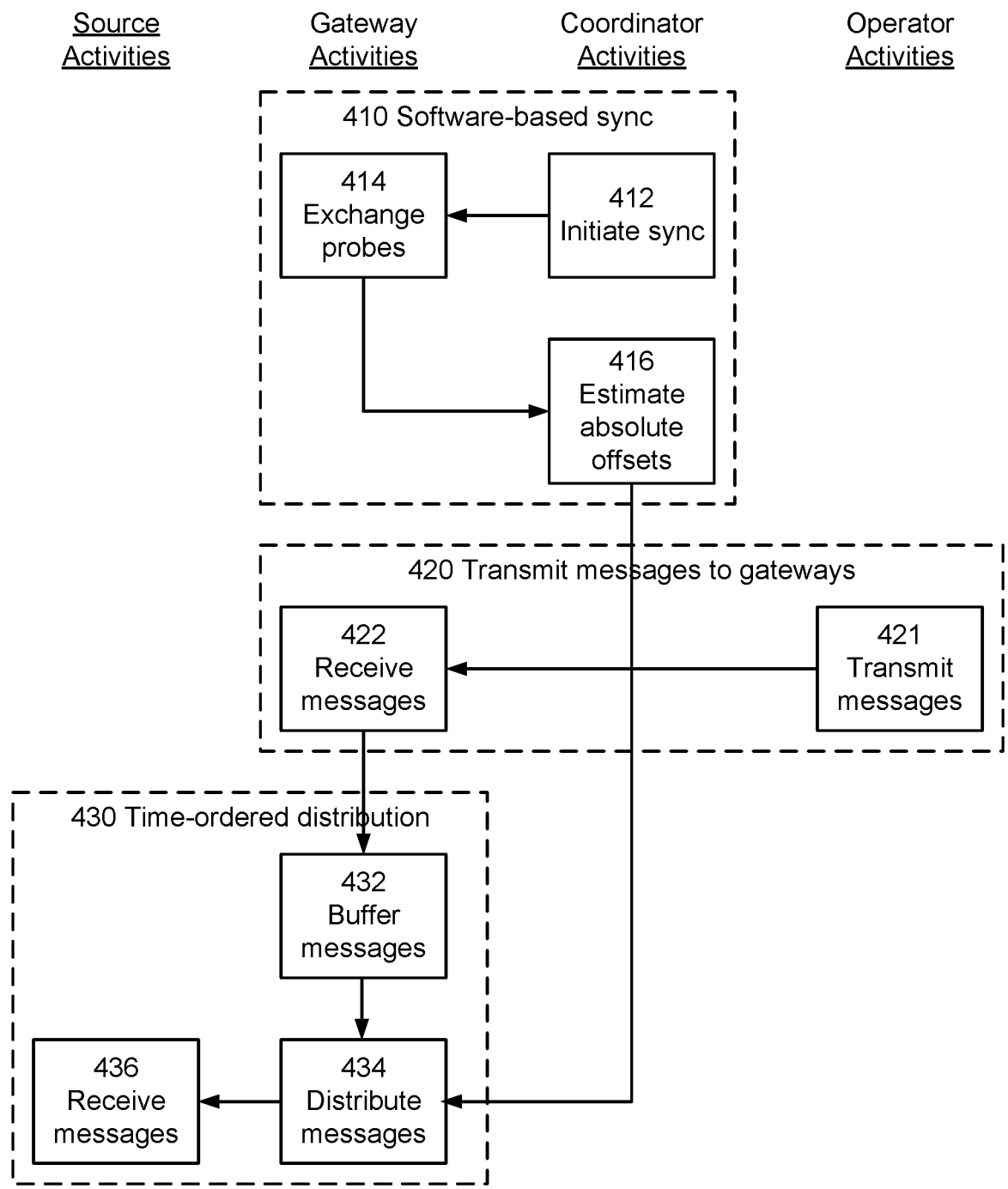
FIG. 4 is a flow diagram for performing a time-triggered distribution of messages, according to an embodiment of the disclosure.

In another aspect of time ordering, FIG. 4 is a flow diagram for performing a time-triggered distribution of messages, according to an embodiment of the disclosure. FIG. 4 includes four columns for source activities, gateway activities, coordinator activities and operator activities. In this example, a box which appears in a column is performed by the corresponding entity. Flow 400 begins with sub process 410, which establishes software-based synchronization. Like sub process 310, software-based synchronization 410 begins with a coordinator (e.g., coordinator 230) initiating 412 a synchronization operation on a set of machines that includes one or more gateways (e.g., gateways 220) and a reference machine (e.g., operator node 240, which includes reference clock 245). The machines (including the one or more gateways and reference machine) exchange 414 probes with machines within region 205. As illustrated, the coordinator estimates 416 absolute offsets with respect to the reference clock of the reference machine based on the exchanged probes; however, in alternate embodiments, the gateways themselves may estimate the absolute offsets. Software-based synchronization, including exchange of probes, and estimating absolute offsets is described in further detail with respect to FIGS. 6-11 below. At the conclusion of software-based synchronization 410, the gateways (e.g., gateways 220) are synchronized to the reference clock.

Sub process 420 of flow 400 transmits 421 messages from the operator (e.g., operator 240) to the gateways (e.g., gateways 220). For example, the messages may be the buy/sell orders (the so-called "order book information") in a financial exchange, where all buy/sells orders should be distributed to the market participants at the same time, even if the market participants are at geographically different locations. In another embodiment, the messages from the operator may be sensitive information that is independent of performance 336 of a time-ordered information. In either case, the messages generally are of the type that should be released to the public (e.g., source nodes 210) simultaneously in order to achieve fairness, so that no member of the public has an unfair advantage with respect to using the information. The transmitted messages may be copies of a same original message, sent to multiple gateways for further distribution.

After receiving 422 the messages, sub process 430, where time-ordered distribution is performed, occurs as part of flow 400. The gateways each buffer 432 the messages for distribution. After the messages are buffered, the gateways distribute 434 the messages to their destinations. The distribution 434 of the messages occurs simultaneously at each gateway, ensuring that the destinations receive the messages simultaneously (subject to jitter encountered by the messages on their way to the destination). To ensure the simultaneous distribution 434 of the messages, the gateways are instructed to distribute the messages at a time determined from the local clock of each gateway as adjusted using the estimated absolute offset for that gateway as estimated in sub process 410. In an embodiment where network conditions or physical limitations of network links are known to delay messages to particular destinations, the gateways may account for this delay by applying additional offsets to when the messages addressed to those particular destinations are to be distributed. In another embodiment, the messages may be the buy/sell orders issued by a single market participant and sent to different financial exchanges for execution, where the buy/sell orders should be submitted for execution at the different financial exchanges at the same time.

Figure 5A:
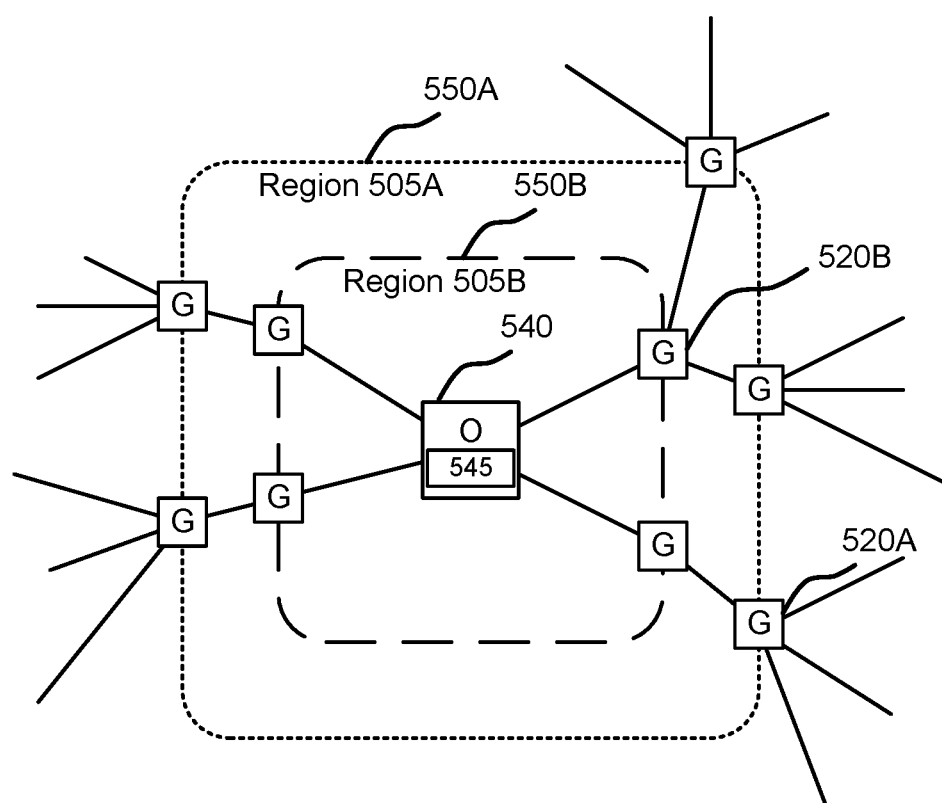
FIGS. 5A-5B are graphs of computer systems using two or more regions of networked machines, according to embodiments of the disclosure.
Figure 5B:
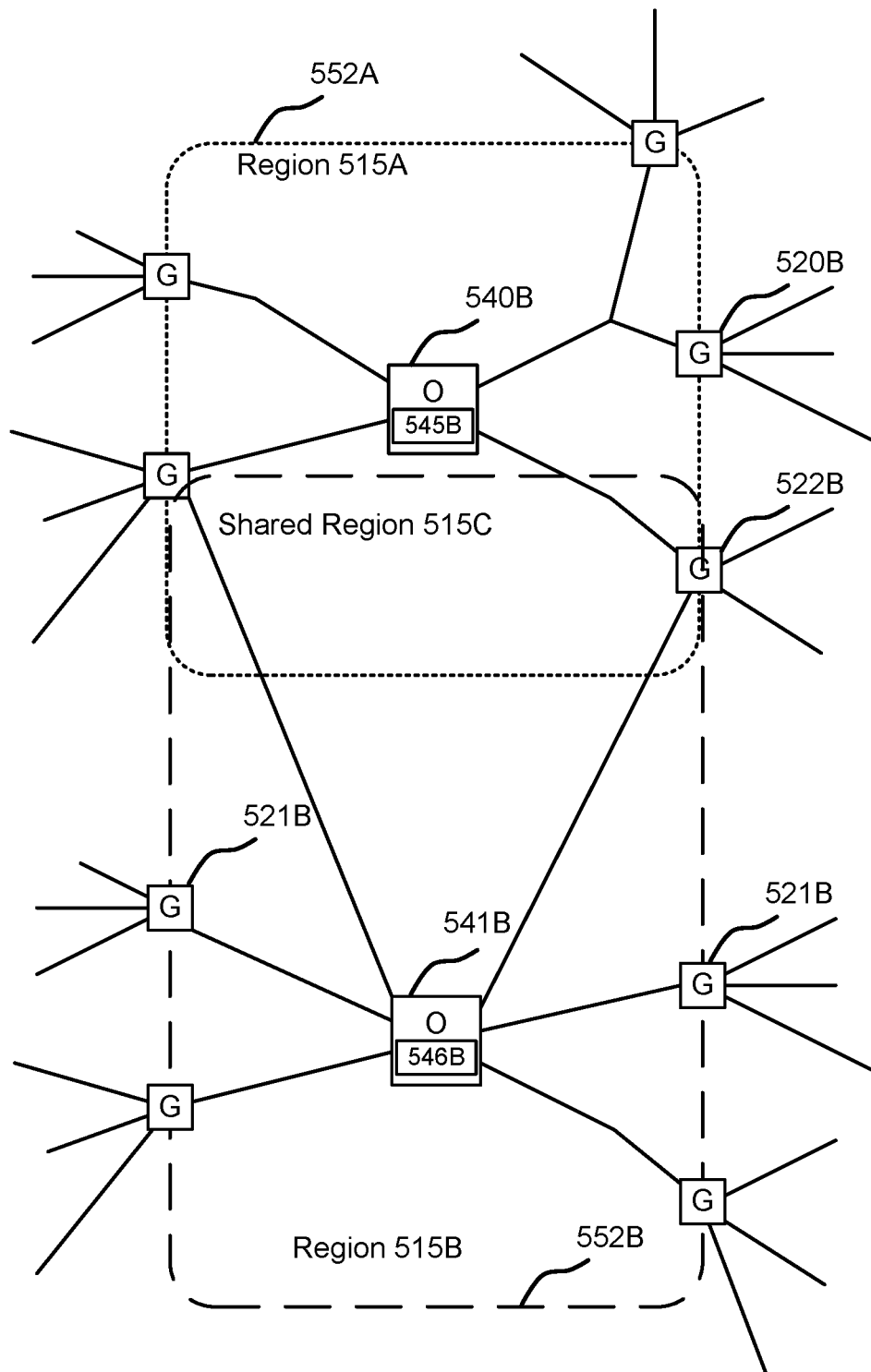

FIG. 5A-5B are graphs of computer systems using two or more regions of networked machines, according to embodiments of the disclosure. As distinguished from FIG. 2, which contains one region 205, FIGS. 5A-5B include multiple regions, each region defined by a different time perimeter. Gateways 520A together form time perimeter 550A, which defines a boundary for region 505A. Gateways 520B together form time perimeter 550B, which defines a boundary for region 505B. Messages bound for processing by operator node 540 first cross the time perimeter 550A and then cross the time perimeter 550B. As illustrated, operator 540 includes reference clock 545, to which all of gateways 520A and 520B are synchronized. However, region 505A, in addition to being synchronized to reference clock 545, may also be synchronized to a different reference clock, such as a reference clock of any of gateways 520A. In such a scenario, gateways 520A may have absolute offsets estimated with respect to two reference clocks—namely, reference clock 545, plus the reference clock of one of gateways 520A. Software-based synchronization 310 and 410, in such scenarios, may be applied to one or both reference clocks. Regions 505A and 505B may be under the control of different entities (e.g., different financial exchanges or different video game servers).

In an embodiment, perimeters 550A and 550B may be hierarchically organized, where one of the perimeters is known to operator node 540 to have a higher priority than the other in determining how to time order messages. For example, where perimeter 550A is higher in the hierarchy, messages having timestamps from both perimeters 550A and 550B will be processed in accordance with the timestamps from perimeters 550A. However, where timestamps from perimeter 550A are the same, or within a threshold distance from one another (e.g., a distance defined by a margin of error, such as a few nanoseconds), timestamps applied at perimeter 550B may be relied upon as a tiebreaker for operator node 540 to determine how to time order the messages.

FIG. 5B depicts an illustrative embodiment where one perimeter partially overlaps with another perimeter. As illustrated, perimeter 552A, which forms region 515A, partially overlaps with perimeter 552B, which forms region 515B, forming shared region 515C. Gateways 520B together form time perimeter 552A, which defines the boundary of region 515A. Gateways 521B together form time perimeter 552B, which defines region 515B. The partial overlap occurs because gateways 522B are part of both perimeters 550B and 551B. Where regions 515A and 515B overlap, shared region 515C is formed. Gateways 522B may be synchronized in such a scenario to multiple reference clocks, such as reference clocks 545B and 546B. In an embodiment, other machines in shared region 515C may have absolute offsets estimated with respect to the reference clocks of region 515A and region 515B—that is, reference clocks 545B and 546B. Software-based synchronization 310 and 410, in such scenarios, may be applied to one or both of reference clocks 545B and 546B for machines within shared region 515C. Regions 515A and 515B may be under the control of different entities (e.g., different financial exchanges or different video game servers). Hierarchical processing of time ordering for packets received in the perimeter of shared region 515C may be performed, as described above with reference to FIG. 5A.

Figure 6:
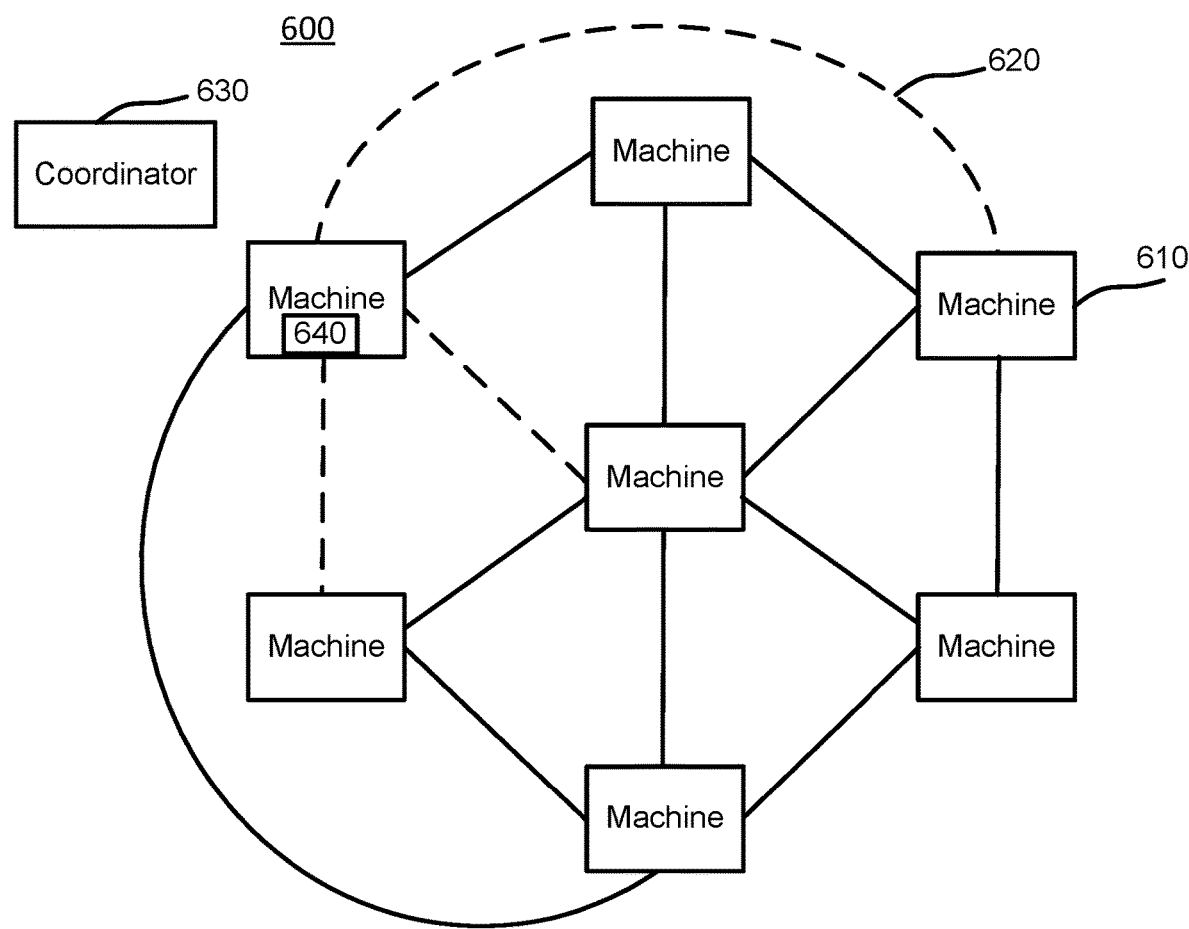
FIG. 6 is a graph of a network including a coordinator for performing a software-based synchronization of gateways, according to an embodiment of the disclosure.

FIGS. 6-11 illustrate a software-based synchronization process according to an embodiment. FIG. 6 is a graph of a network including a coordinator for executing an embodiment of the disclosure. Network 600 exemplifies a different implementation of network 200 of FIG. 2, where like reference numerals and terms carry the same weight of description across these and other figures. Network 600 includes machines 610, which are the nodes of the graph. Machines 610 may be gateways, such as gateways 220 of FIG. 2. As depicted, network 600 is a mesh network, where each machine 610 is linked to each other machine 610 by way of one or more links (some links omitted for clarity). However, network 600 may be any other type of network. For example, network 600 may be a network where machines are serially connected on a wire, or may be in any other configuration. The network may be a large network spanning multiple physical regions (e.g., New York to San Francisco), or a small network, such as a network within a single server blade. In an embodiment, network 600 may be a network of clocks on one or more printed circuit boards.

The communication links between any pair of machines are represented as an edge 620 between the nodes in the graph. Each edge 620 typically represents multiple paths between any two machines 610. For example, the network 600 may include many additional nodes other than the machines 610 that are shown, so that there may be multiple different paths through different nodes between any pair of machines 610.

Network 600 additionally includes coordinator 630 and reference clock 640. In this example, coordinator 630 commands machines 610 to obtain network observations by probing other machines 610, as will be described in greater detail below with respect to FIG. 8. Coordinator 630 may store, or cause to be stored, records of those network observations, as will also be described in greater detail below with respect to FIG. 8. Coordinator 630 may additionally transmit control signals to machines 610. The term control signal, as used herein, may refer to a signal indicating that the frequency of a local clock of a machine is to be adjusted by a specified amount (thus correcting a drift of the local clock), and may also refer to a signal indicating that a time indicated by a local clock a machine is to be adjusted by a specified amount (thus correcting an offset of the local clock).

In an embodiment, coordinator 630 stores, either within a machine housing coordinator 630 or within one or more machines of network 600, a graph that maps the topology of network 600. The graph may include a data structure that maps connections between machines of network 600. For example, the graph may map both direct connections between machines (e.g., machines that are next hops from one another, either physically or logically), as well as indirect connections between machines (e.g., each multi-hop path that can be taken for a communication, such as a probe, to traverse from one machine to another). The graph may additionally include network observations corresponding to each edge in the graph (e.g., indicating probe transit times for probes that crossed the edge, and/or additional information, such as information depicted in FIG. 8).

One of the machines contains a reference clock 640. Reference clock 640 is a clock to which the clocks within the machines of network 600 are to be synchronized. In an embodiment, reference clock 640 is a highly calibrated clock that is not subject to drift, which is contained in a machine 610 that is different than the other machines to be synchronized. In another embodiment, reference clock 640 may be an off-the-shelf local clock already existing in a machine 610 that will act as a master reference for the other machines 610, irrespective of whether reference clock 640 is a highly tuned clock that is accurate to "absolute time" as may be determined by an atomic clock or some other highly precise source clock. In such scenarios, coordinator 630 may select which machine 610 will act as the master reference arbitrarily, or may assign the reference machine based on input from an administrator. The reference clock may be a time source, such as a global positioning system (GPS) clock, a precision time protocol (PTP) Grandmaster clock, an atomic clock, or the like, in embodiments where the reference clock 640 is accurate to "absolute time." As will be described in greater detail with respect to FIGS. 10-11, coordinator 630 may use reference clock 640 when calibrating a control signal. By signaling corrections to frequency and/or offset based on reference clock 640, coordinator 630 achieves high-precision synchronization of the local clocks of machines 610 to the reference clock 640.

While only one reference clock 640 is depicted in FIG. 6, in an embodiment, multiple reference clocks 640 may be present (e.g., as described in reference to FIGS. 5A and 5B). For example, additional reference clocks may be used for redundancy in case of failures of the reference clocks or the machines housing them. As another example, machines 610 may be divided into multiple groups or regions (e.g., as described in reference to FIGS. 5A and 5B) (e.g., based on settings applied by an administrator of network 100). For example, network 600 may be configured to divide machines 610 into groups that each have a predefined number, or percentage, of machines 610, which may improve performance or implementation. Within each group, one machine may be nominated to be a reference, and the clock of that machine will thus be used as the reference clock for the remaining machines. Further, the groups may nominate one group as a reference group, thus leading to the reference group's reference clock acting as a reference for all groups. The reference clock and group may be nominated automatically consistent with clock nomination described herein, or may be input by a network administrator. As an example, where a network includes five thousand machines, and an administrator programs the network to divide the machines into groups that each hold one hundred machines (e.g., based on specifying one hundred machines, or by specifying a percentage), there will be fifty groups of machines, each including one hundred machines. One of the one hundred machines will be a reference machine, and the other ninety-nine of the one hundred machines will be sync to the reference machine's clock. Moreover, of the fifty groups, one will be a reference group, and the other forty-nine groups will sync to the reference group.

Coordinator 630 may be implemented in a stand-alone server, may be implemented within one or more of machines 610, or may have its functionality distributed across two or more machines 630 and/or a standalone server. Coordinator 630 may be accessible by way of a link 620 in network 600, or by way of a link to a machine or server housing coordinator 630 outside of network 600. Reference clock 640 may be implemented within coordinator 630, or may be implemented as a separate entity into any of machines 610, a standalone server within network 600, or a server or machine outside of network 600.

Figure 7:
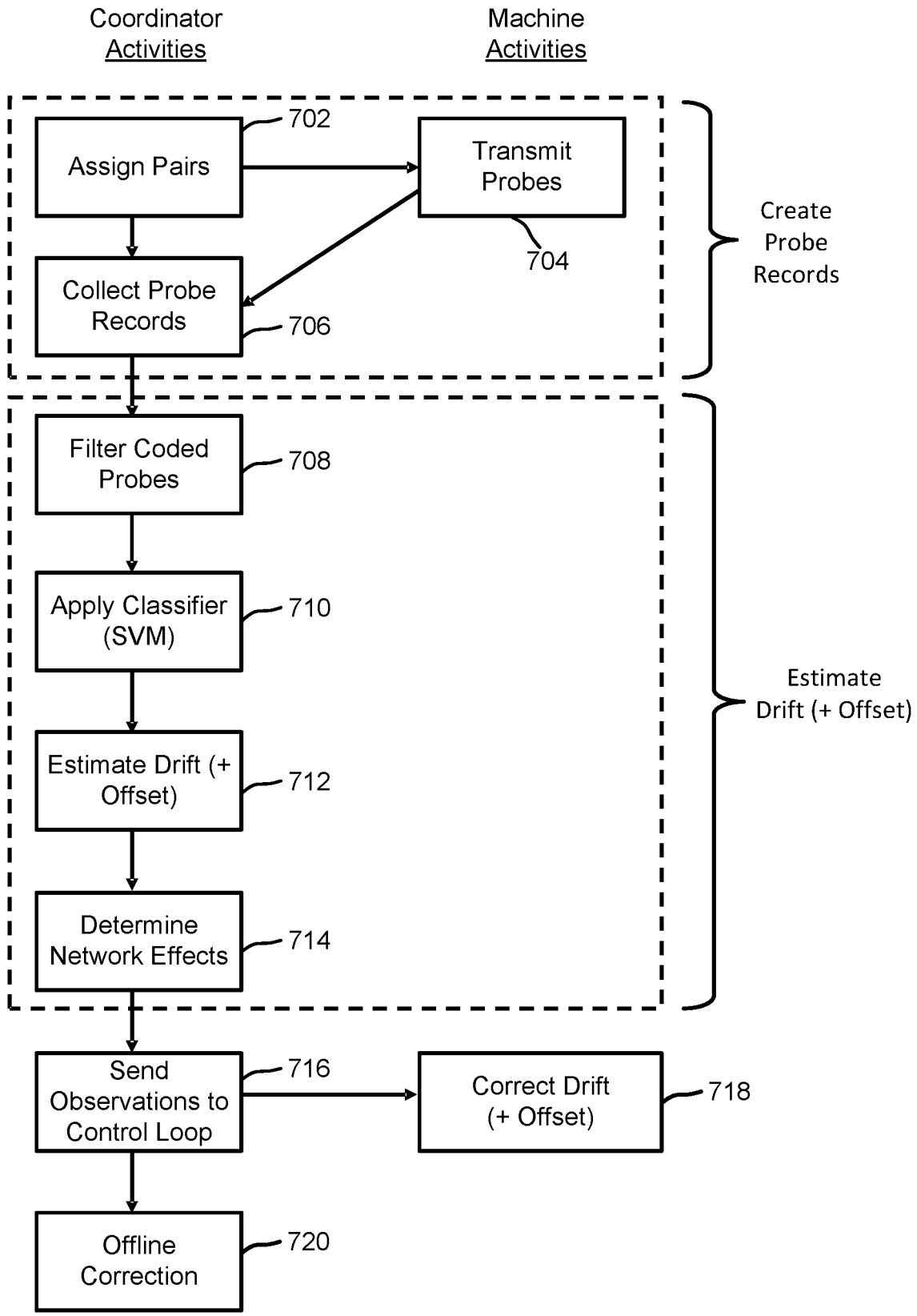
FIG. 7 is a flow diagram for correcting clock offset and/or frequency, according to an embodiment of the disclosure.

FIG. 7 is a data flow diagram for correcting clock frequency and/or offset, according to an embodiment of the disclosure. For example, some or all of data flow 700 may be used to achieve software-based synchronizations 310 and/or 410. The left column of FIG. 7 describes activities of a coordinator (e.g., coordinator 630) in achieving highly precise clock synchronization by correcting clock frequency (i.e., drift) and/or offset; the right column describes activities of machines (e.g., machines 610). FIG. 7 can be thought of as including three phases—a first phase where network observations are made by having machines probe other machines of a network (e.g., network 600), a second phase where the network observations are used to estimate offset and drift of the machines, and a third phase where frequency and/or offset is compensated/corrected in order to achieve highly precise clock synchronization between the machines.

As part of the first phase, data flow 600 begins with a coordinator (e.g., coordinator 630) assigning 702 machine pairs. The term pair, as used herein, refers to machines that send probes to one another for the purpose of collecting network observations. As used herein, the term network observations may refer to observable qualities of a network (e.g., effect of network operation, as defined below; queuing delays; observable drift; offset; etc.). The term probes, as used herein, refers to an electronic communication transmitted from one machine to another machine, where the electronic communication is timestamped at its time of transmission from a sending machine, and at its time of receipt at a receiving machine. The timestamps may be applied by any component of the machines that are configured to apply timestamps, such as respective CPUs of the sending and receiving machines and/or respective NICs that are a part of, or that are operably coupled to, the sending and receiving machines. A single machine typically is paired with multiple other machines. When assigning machine pairs, the coordinator may assign a machine to pair with a number of machines, the number being less than all machines in the network. In an embodiment, the number and pairings of machines may be predefined or may dynamically change based on network conditions (e.g. congestion, latency, etc.). The machines may be selected at random, or through a deterministic algorithm.

Data flow 700 progresses by coordinator 630 instructing the paired machines to transmit 704 probes to one another. The network observations collected from the probe transmissions are collected 706 into probe records. The term probe record, as used herein, may refer to a data structure including network observations obtained from the probe transmissions, such as the identity of a transmitting machine and a receiving machine, a transmit timestamp, a receive timestamp, etc. The transit time for a probe may be determined based on the transmit timestamp and the receive timestamp. Probe records are described in further detail below with respect to FIG. 8. While the embodiment described here indicates that the coordinator collects the probe records, in an embodiment, some or all of the machines may each collect probe records pertaining to probes transmitted to or from them, and may themselves perform processing on the probe records.

After the probe records are collected, the coordinator (e.g., coordinator 630) enters the second phase of using the collected probe records to estimate offset and/or drift for the machines (e.g., machines 610). In this example, to achieve accurate estimations, the coordinator first filters 708 the probe records to identify coded probes. The term coded probes, as used herein, refers to probes that correspond to probe records that are not affected by noise, such as delay caused from queuing the probes. One manner in which the coordinator identifies coded probes is described in further detail with respect to FIG. 8. The subset of probe records that correspond to coded probes may be referred to as coded probe records. In an embodiment where probe records are collected at a given machine, that given machine may perform the filtering 708 of the probe records collected by that given machine.

Data flow 700 continues by applying 710 a classifier to the coded probe records. The classifier may be a machine learning model trained through supervised learning. An example classifier is a support vector machine ("SVM"). The coordinator may input upper and lower bound points derived from coded probe data (i.e., samples of transit time) from two paired machines over a time period. The output of the classifier is a linear fit to the transit time data with a slope and intercept. Data flow 700 then continues with the coordinator estimating 712 the drift between pairs of machines. In an embodiment, the coordinator estimates drift to be equivalent to, or a function of, the slope of the linear fit (i.e., estimate of rate of change of transit time). The coordinator may also estimate offset using the intercept of the linear fit. Determining/estimating offset may be performed in a similar manner to doing so for drift wherever disclosed. In an embodiment where probe records are collected at a given machine, that given machine may perform the applying 710 of the classifier to the probe records collected by that given machine, and the estimating 712 of the drift between the pairs of machines.

The drift estimate may not be completely accurate because, while the coded probes did not suffer from queuing delay, the coded probes may have suffered from the effect of network operation. The effect of network operation, as used herein, may refer to noise caused by components of a network. For example, a link or gateway between two paired machines may introduce latency or jitter that affects the drift estimation. In an embodiment, the coordinator uses 714 the network effect based on frequency drift estimations across three or more machines. Further details for using 714 the network effect will be described with respect to FIG. 9 below.

The coordinator sends 716 observations to a control loop of a local clock of a machine, e.g., by applying a filter to the estimated drift that is based on the effect of the network operation, or by feeding the estimated drift and the effect of the network operation to a machine learning model, the output of which is the absolute drift. Here, "absolute" drift or offset are relative to the reference clock. Further details about the control loop and how the coordinator estimates the absolute drift are described in further detail below with respect to FIGS. 10-11. After estimating the absolute drift, the coordinator may determine whether to correct 718 the clock frequency in real-time or near real-time. Absolute offsets may also be corrected 718, or the coordinator may perform 720 an offline correction. How to determine whether to correct in real-time, or offline, is described further below with reference to FIGS. 10-11.

In addition to correcting clock frequency and/or offset, process 700 recurs periodically for each machine pair to ensure that any new offset and drift that has occurred after correcting clock frequency and/or offset is continuously corrected. For example, process 700 may occur periodically (e.g., every two seconds) to ensure synchronization across the network (e.g., network 100) is maintained. The updated synchronization is used at each instance of software-based synchronization 310 and 410.

Returning to a discussion of FIG. 6, a discussion appears here that further details the creation of probe records in activities 202-206 of data flow 200. The number of machines 600 that are paired to a given machine may be a number that is fixed by an administrator. In an embodiment, coordinator 630 may dynamically adjust the number of machines that are paired to each given machine for probing based on network conditions. For example, if network connectivity is above a threshold quality (e.g., based on a low amount of latency), coordinator 630 may reduce a number of machines that are paired for probing proportionally to the quality of network connectivity. On the other hand, as network connectivity quality deteriorates, coordinator 630 may increase the number of machines that are paired for probing to each given machine. The number of machines that are paired may also vary based on network size.

When selecting which machines should be paired to a given machine, coordinator 630 may randomly determine each machine to which the given machine should be paired. In an embodiment, coordinator 630 non-randomly determines pairings based on ease of computation, accuracy (e.g., clock synchronization accuracy as dictated by the network graph), and load balancing across each machine 610. Coordinator 630 may judiciously determine pairings based on design choice, with an administrator selecting pairings, or selecting parameters that cause certain pairings to be selected. Further, coordinator 630 may instruct a larger number of pairings to occur for machines that have a high level of diversity, relative to a number of pairings for machines that have a low level of diversity. As used herein, the term "diversity" may refer to a large number of paths from which a probe may cross within network 600 to reach a machine from another machine; the higher the number of paths, the higher the diversity.

It is noted that probes may occur at a particular frequency or period of time, which may vary based on one or more parameters. For example, coordinator 630 may command a machine that has a high diversity to transmit a large number of probes to one or more paired machines, each down a different path, as compared to a machine that has a low diversity, which may transmit a lower number of probes. Coordinator 630 thus may command machines to transmit machines to paired machines at a frequency that varies proportionate to diversity.

The coordinator (e.g., coordinator 630) determines 702 that a given machine 610 is paired with various other machines 610, and receives probes from those same machines. The term "exchange" is used herein to describe scenarios where paired machines transmit and receive probes from one another. As used herein, the term exchange does not imply a timing aspect, such as a requirement that machines are transmitted simultaneously or responsive to one another.

In an embodiment, network 600 may be a trustless system, such as a system facilitating a blockchain network. In such an embodiment, some of machines 610 may misbehave and misrepresent data used to determine offset and/or drift. In such a scenario, in addition to the probes discussed above and with respect to FIG. 8, coordinator 630 may instruct machines 610 to probe, at low frequency (e.g., once per every ten, or one hundred, or one thousand probes sent in normal course), a larger number of machines (e.g., one-third of the machines of network 600). Coordinator 630 may determine therefrom whether the data obtained from the larger number of machines is consistent with the smaller number of machines that are probed in normal course (e.g., within a threshold tolerance amount of drift and/or offset), and may alert an administrator or take corrective action if inconsistent probe data is detected.

FIG. 8 is a data structure diagram that illustrates probe records, and manners of identifying coded probes from the probe records, according to an embodiment of the disclosure. Data structure 800 includes exemplary probe records for a plurality of probes. While data structure 800 is depicted to include probe records for a single transmitting machine "A" (which is, e.g., a machine 610 of network 600) and a single receiving machine "B," any number of transmitting or receiving machines may have probe records stored within data structure 800. Column 810 includes identifiers for probes, each identifier 1 through 6 corresponding to a probe record for a probe. Column 820 indicates which machine transmitted a probe indicated by a given probe record. Column 820, as depicted, indicates that a transmitting machine labeled "A" transmitted each probe; however, this is merely exemplary and various transmitting machines may be identified in column 820.

Column 830 indicates which machine received a probe indicated by a given probe record. Column 830, as depicted, indicates that a receiving machine labeled "B" received each probe; however, this is merely exemplary and various receiving machines may be identified in column 830. Column 840 indicates a transmit time of a probe. The transmit time is a time that is timestamped either by the transmitting machine itself (e.g., a CPU of transmitting machine "A" of network 600), or by an interface or device operably coupled to the transmitting machine (e.g., a NIC of transmitting machine "A" of network 100). Similarly, column 850 indicates a receive time of a probe, which is a timestamp by the receiving machine or, e.g., a NIC of the receiving machine. In an embodiment, a machine having a single CPU may have a plurality of NICs. In such an embodiment, coordinator 630 may cause the multiple NICs of a machine (e.g., the receiving machine) to sync to a clock of the CPU of the machine (e.g., by having the CPU synchronize its time to the time of the NIC, using the NIC as a reference machine as described herein), and then have the other NICs synchronize to the CPU, thus causing the multiple NICs of the machine to be synchronized.

The coordinator may command machines to transmit probes with a specified or predetermined time interval between probes. As used herein, the term "transmission time spacing" ($\delta$) refers to the specified interval or predetermined time interval between the transmission times of two probes. The interval may be a constant value or may be dynamically selected by the coordinator based on network conditions (e.g., if the network is congested, a longer transmission time spacing may be selected). As can be seen in FIG. 8, probe 1 is sent at time T1, which may be an arbitrary time or a time specified by the coordinator. Probe 2 is sent at time T1+$\delta$, as the coordinator has instructed transmitting machine A to transmit a probe to receiving machine B at one or more time intervals. Further probes may be commanded by the coordinator to be transmitted from transmitting machine A to receiving machine B from the reference point of time T1; however, for ease of illustration, only two are shown in FIG. 8. Similarly, probes 3 and 4 are sent at times T2 and T2+$\delta$, respectively, and probes 5 and 6 are sent at times T3 and T3+$\delta$, respectively.

Probe IDs 1 and 2, 3 and 4, and 5 and 6 are paired to illustrate how the coordinator determines whether a pair of probes are coded probes. Coded probes are probes that are transmitted with a specific spacing of $\delta$, or within a threshold distance from $\delta$. That is, the probes are coded based on the space between each probe. Delay in timestamping probes may be caused by queues at a transmitting machine 820 and/or at a receiving machine 830 or through intermediate nodes. Coded probes are thus pairs of probes that are consecutively transmitted by a same transmitting machine 820, and received by a same receiving machine 830, with receive times that differ by $\delta$, or within a threshold margin of $\delta$ (to accommodate minimal differences in delay between the two probes). That is, the transit times of two coded probes is approximately the same. While pairs are primarily used to describe coded probes, this is merely exemplary; coded probes may be triplets, quadruplets, etc., of probes with a spacing of $\delta$.

Probes 1 and 2 show a scenario where two probes do not form coded probes because probe 1 has a transit time of TT, but probe 2 has a transit time of TT+D (D representing a delay), where D is greater than a threshold margin. That is, probe 2 has a transit time that is D longer than probe 2. Probes 3 and 4 show a scenario where two probes do not form coded probes because probe 3 has a transit time that is D longer than probe 4. Probes 5 and 6, however, are coded probes because they have the same transit times (to within an acceptable threshold).

In an embodiment, data structure 800 is stored in memory directly accessible to coordinator 630 (e.g., local memory of a machine running coordinator 630). In another embodiment, data structure 800 is distributed across machines 610, where each machine stores a local data structure 800 for probes exchanged between that machine and other machines. Various processing is described below with respect to FIGS. 9-11 that uses information of data structure 800; this processing may be performed by coordinator 630, but may also, or alternatively, be performed by machines 610. Where machines 610 are performing processing (e.g., identifying coded probes, applying a support vector machine, etc.), if one machine is overburdened with other processing, another machine in the pair may retrieve data of data structure 800 of the overburdened machine, and perform the processing on that overburdened machine's behalf.

Figure 9:
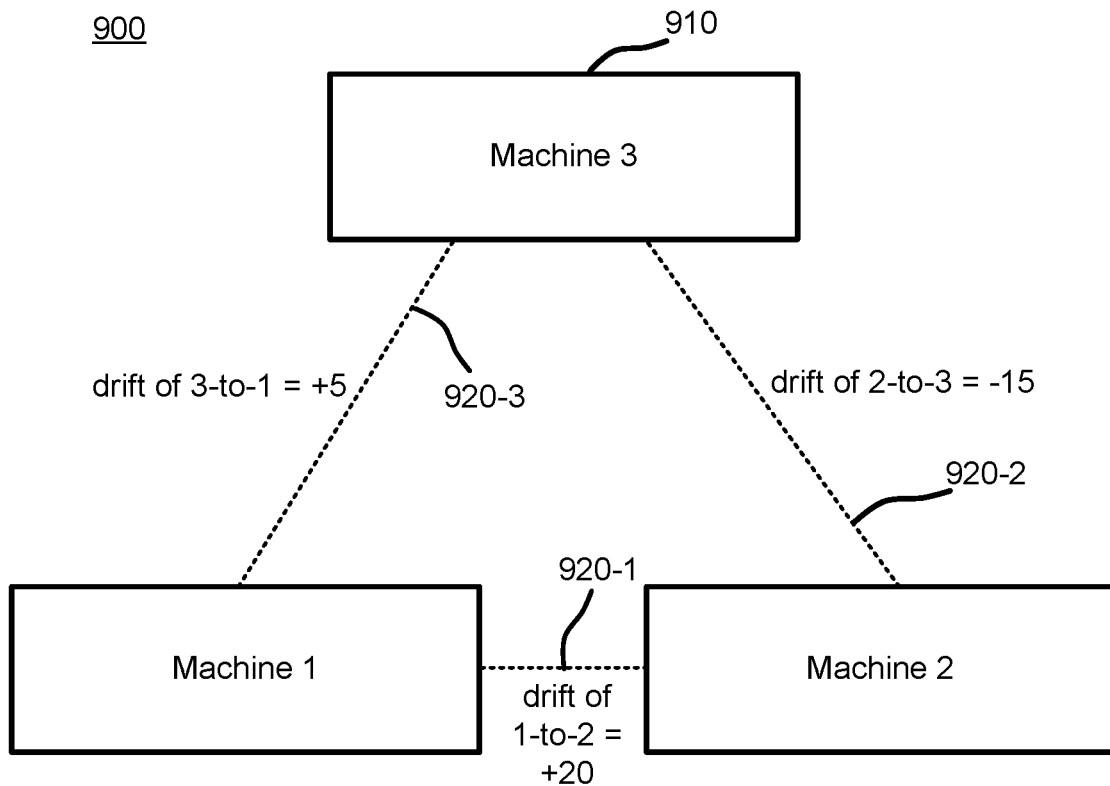
FIG. 9 is a graph of a system that illustrates identifying and correcting loop errors, according to an embodiment of the disclosure.

As was described above with respect to FIG. 7, coded probe records may be input into a classifier, such as an SVM classifier, from which drift may be estimated. However, a drift estimate may nonetheless be inaccurate, but correctable by using the network effect. FIG. 9 is a graph of a system that illustrates identifying and correcting loop errors, according to an embodiment of the disclosure. Machines 910 include machine 1, machine 2, and machine 3, which together form a network loop. Machines 910 have the same functionality described above with respect to machines 110 and 610. While only three machines are depicted, this is merely for convenience; any number of machines may form a network loop. Links 920 connect the machines of the network loop, where links 920-1 connect machine 1 to machine 2, links 920-2 connect machine 2 to machine 3, and links 920-3 connect machine 3 to machine 1. Each link may represent multiple different paths between each pair of machines.

The numbers over each link 920 are the drift between the two machines that are connected by each respective link in arbitrary units. Thus, link 920-1 reflects a drift of +20 units for the drift of machine 1 relative to the drift of machine 2, link 920-2 has a drift of −15 units between machines 2 and 3, and link 920-3 reflects a drift of +5 units between machines 3 and 1. The sum of the drifts around a given loop (referred to as the loop drift error, which is a result of network effect applied to frequency) is reflective of error in an estimated clock drift. Thus, if there was no loop drift error, then the sum of the drifts of all links in the loop would be 0 units. However, as depicted, the sum of the drifts is 10 units (in that 20−15+5=10), which may be caused by inaccurate clock estimates, which can be corrected using the network effect. The coordinator may assign a given machine to be part of multiple loops when assigning pairs. The coordinator may combine all loops for different pairs of machines to estimate clock drift more accurately using the network effect. When assigning pairs, the coordinator is not constrained by a need for path symmetry; the time taken (or number of hops) to go from machine 1 to machine 2 need not be the same as the time taken to go from machine 2 to machine 1. In an embodiment, some of the loops includes reference clock 640, thus ensuring the network effect is determined with respect to the reference clock. In an embodiment (e.g., where coordinator 630 is not present), the network effect can be used without reference to a reference clock, where each clock determines its frequency drift, and a statistical operation (e.g., average) is taken to determine the loop drift error. These loop drift errors around different loops are used to adjust the absolute drift of the machines in the loops. For example, the loop drift error for a loop may be allocated among the different machines in the loop.

Figure 10:
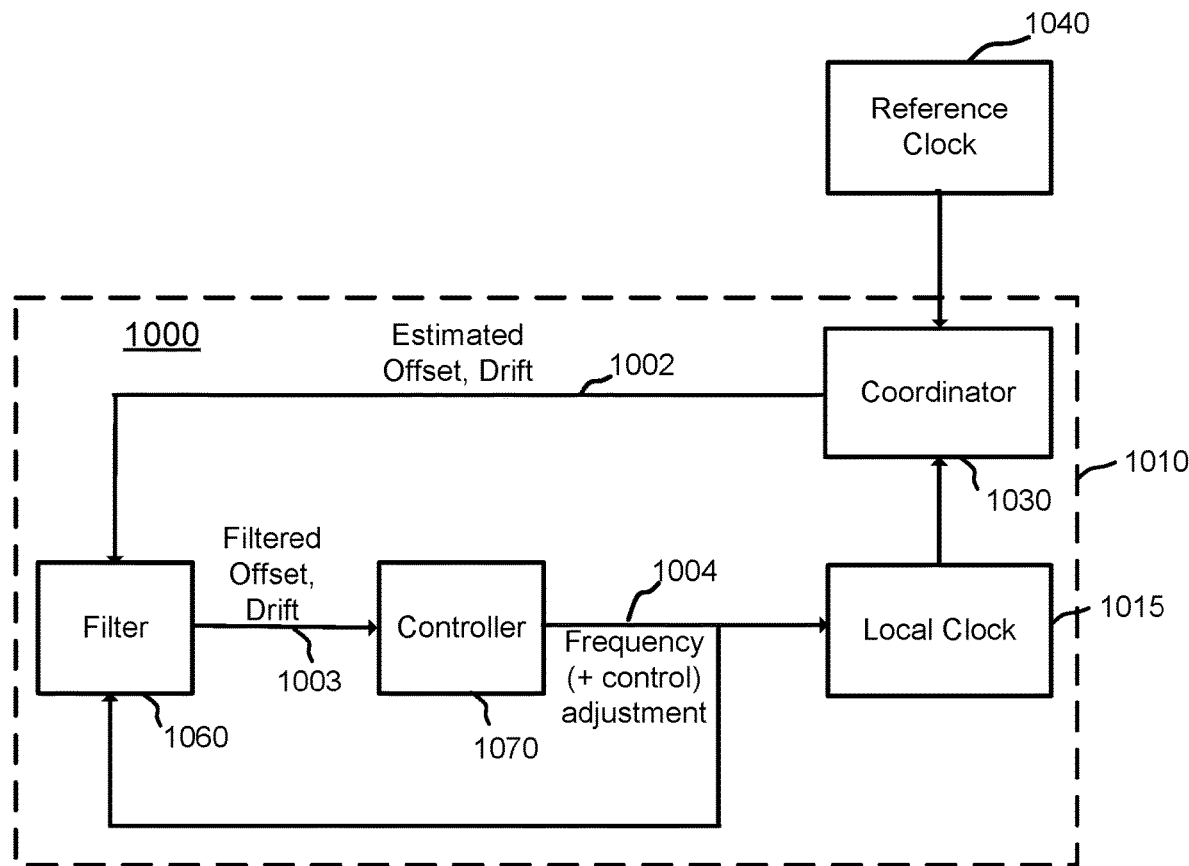
FIG. 10 is a block diagram of a model of a control system to correct a local clock frequency of a machine, according to an embodiment of the disclosure.

FIG. 10 is a block diagram of a model of an adaptive stochastic control system to correct a local clock frequency of a machine, according to an embodiment of the disclosure. Control loop 1000 is used to adjust the frequency of a local clock 1015 of a machine 1010 by way of a control signal 1004. The machine 1010 may be a machine of network 600, and includes the same functionality described above with respect to machines 110 and machines 610. Coordinator module 1030 is depicted as part of machine 1010, but may alternatively sit wholly or partially in a separate coordinator (e.g., coordinator 630), as described above with respect to FIG. 1.

Coordinator module 1030 estimates the absolute offset and absolute drift 1002 of machine 1010, as described above with respect to FIGS. 7-9. These are absolute quantities because they are measured against the reference clock that is connected to a source of absolute time. The control loop 1000 also includes a filter 1060 and a controller 1070. Filter 1060 may be a predefined filter (e.g., a Kalman filter), a filter selected from an adaptive filter bank based on observations, a machine learning model, etc. Kalman filters and adaptive filter banks are discussed in further detail with respect to FIG. 11; use of a machine learning model is discussed in further detail with respect to FIG. 11.

The purpose of filter 1060 is two-fold: first, to reduce noise in the drift and offset estimations and, second, to extrapolate the natural progression of the clock. Process 700 (from FIG. 7) repeats on a periodic basis (e.g., every two seconds), and thus control loop 1000 loops periodically as well. In an embodiment, clock offsets are estimated in the middle of the period (e.g., 1 second into a 2-second period), whereas control signals happen at the end of the period (e.g., at the 2-second mark of the 2-second period). Thus, filter 1060, in addition to reducing noise in the estimate, extrapolates to output 1003 filtered offset and drift values that are accurate at the time of control. Filtered offset and drift are received by controller 1070. Controller 1070 outputs 1004 a frequency (and offset) adjustment signal to local clock 1015 of machine 1010, the adjustment being reflective of frequency and offset value changes in local clock 1015 to remove offset and drift from local clock 1015. The frequency and offset adjustments are also fed back to filter 1060 as parameters for the filter, in addition to the estimated offset and drift for the filter, on a subsequent cycle of the control loop. In this control loop, the plant under control is determined by the state variables {absolute offset, absolute drift} of the local machine and an adaptive stochastic controller is used to control the plant. As will be described with respect to FIG. 11 below, adaptive stochastic control refers to adjusting control signals based on a likelihood that a given adjustment is a correct adjustment, as compared to other possible adjustments; as control signals are applied, actual adjustments are observed, and probabilities that each possible control signal will lead to a correct adjustment are adjusted.

Figure 11:
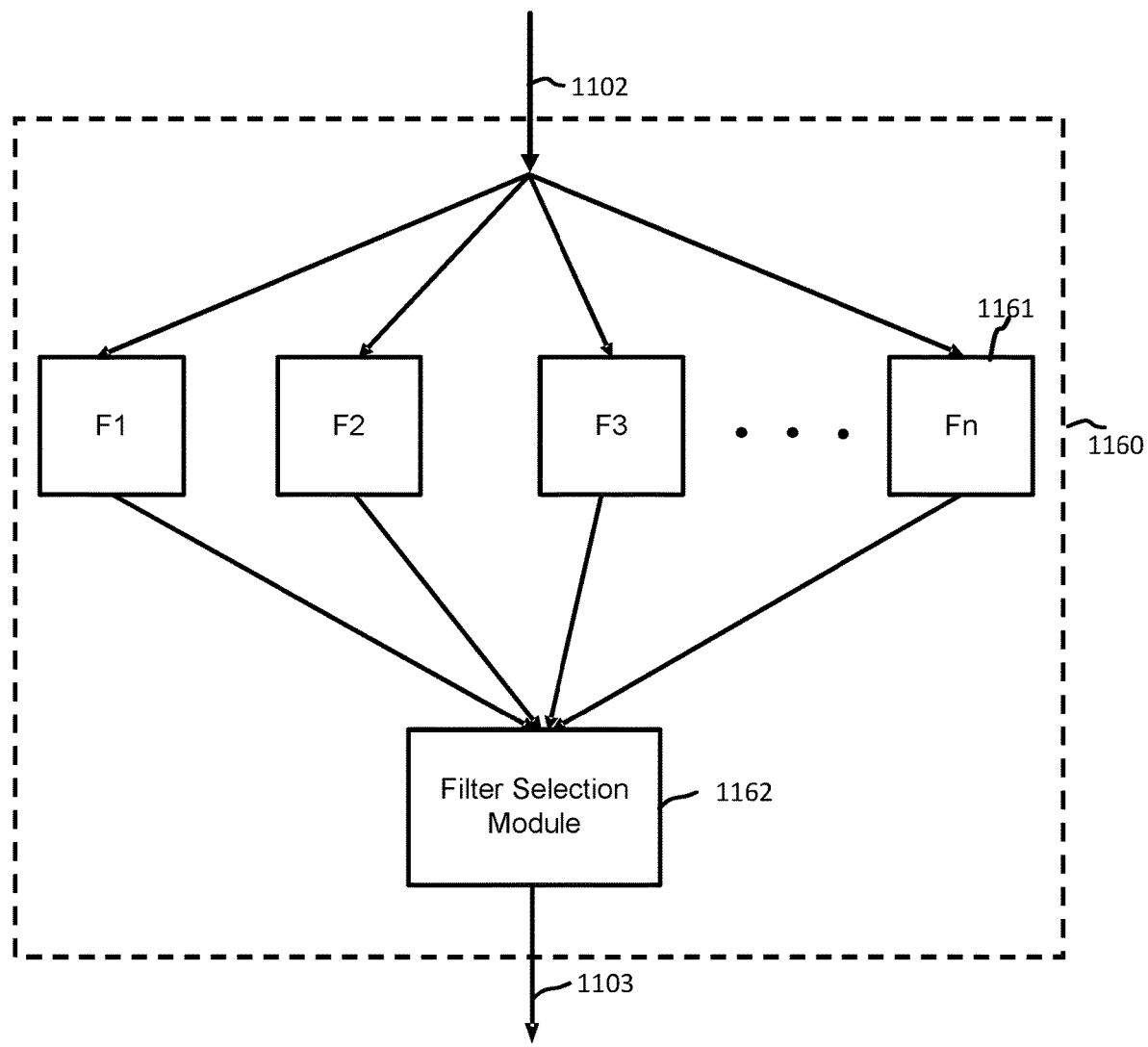
FIG. 11 is a block diagram of an adaptive filter bank, according to an embodiment of the disclosure.

FIG. 11 is a block diagram of an adaptive filter bank, according to an embodiment of the disclosure. The term adaptive filter bank, as used herein, may refer to a collection of candidate filters, each of which is best suited to remove noise from signals based on the type and degree of noise. For example, some noise can be observed, such as the network observations discussed with respect to FIGS. 6-10 (e.g., queuing delays, effect of network operation, loop errors, etc.). Some noise, however, is inherent in the state of the machines, and is unknown to control loop 1000 (e.g., noise variations in response to control input across different makes and models of equipment). Noise that is unknown is referred to herein as state noise.

Filter 1160, which includes the functionality of filter 1060 as described above with respect to FIG. 10, includes a bank of candidate filters 1161 (also referred to herein as an adaptive filter bank), which may be Kalman filters. Each of candidate filters 1161 corresponds to a different level of state noise. Filter selection module 1162 is a stochastic selection module, in that it selects a filter from candidate filter 1161 by calculating a probability for each candidate filter being a best fit, and by then selecting the candidate filter with the best fit. Initially, filter selection module 1162 receives observed noise, and uses the observed noise to select a highest probability candidate filter 1161, which is used to filter the estimated drift and offset 1102, and output the filtered drift and offset 1103 to the controller 1070. Using adaptive stochastic control, it is possible that initially filter selection module 1162 may find that all filters are equally likely, and may select a filter arbitrarily. After selecting a filter and observing how local clock 1015 reacts to a control signal, filter selection module 1162 adjusts the likelihood that each candidate filter 1161 best applies. Thus, as the control signal and further information about the network observations are fed into filter 1160 over time, the selection of an appropriate candidate filter 1161 eventually converges to a best matching candidate filter.

As was discussed with reference to FIG. 7, when deriving the control signal to be transmitted to the local clock of a machine, the correction may be performed in real-time, thus resulting in a real-time control signal (or near real-time control signal). In an embodiment, corrections may be performed offline, such as where observation noise is much smaller than state noise. For example, the coordinator may determine whether observation noise is a predefined amount or factor smaller than the state noise. In response to determining that the observation noise is a predefined amount or factor smaller than the state noise, the coordinator may perform the adjustment offline (or in batched fashion); otherwise, the coordinator may perform the adjustment in real-time or near-real-time and thus cause a control signal to quickly be sent to the local clock. An administrator of the system may set parameters that determine when offline corrections will be made, and may elect that offline corrections are not used at all.

The foregoing description of the embodiments of the disclosure may be implemented in a software module installed for use with off-the-shelf clocks, including inexpensive and inaccurate clocks, such as quartz clocks, for bringing such clocks into highly precise synchronization. The foregoing description of embodiments of the disclosure have been presented for the purpose of illustration; it is not intended to be exhaustive or to limit the invention to the precise forms disclosed, but merely illustrates different examples. It should be appreciated that the scope of the disclosure includes other embodiments not discussed in detail above. Persons skilled in the relevant art can appreciate that many modifications and variations are possible in light of the above disclosure, without departing from the spirit and scope as defined in the appended claims. Therefore, the scope of the disclosure should be determined by the appended claims and their legal equivalents. Like reference numerals in different figures carry the same weight and effect of the description of their counterparts in the different figures.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments described herein is intended to be illustrative, but not limiting, of the scope of the disclosure, which is set forth in the following claims.

What is claimed is:

1. A computer-implemented method for performing a time-ordered operation on messages transmitted from multiple sources to a region of networked machines, the method comprising:
   running a software-based synchronization process to synchronize each of a plurality of gateways with a reference clock, wherein each gateway is a machine on a perimeter of the region of networked machines and is connected to receive messages from multiple sources, and wherein the software-based synchronization process comprises:
      exchanging probes between pairs of machines, wherein the machines exchanging probes include the gateways,
      for different pairs of machines, estimating an offset between the pair of machines based on the transit times of probes exchanged between the pair of machines; wherein the transit time is based on a transmit timestamp from the machine transmitting the probe and a receive timestamp from the machine receiving the probe, and one of the machines produces timestamps based on the reference clock,
      for different loops of at least three machines, calculating a loop offset error based on a sum of the estimated offsets between pairs of machines around the loop, and
      adjusting estimated absolute offsets of the machines based on the loop offset errors, wherein the absolute offset of a machine is defined relative to the reference clock;
   receiving messages that enter the region through one of the gateways, wherein the gateway timestamps the message; and
   performing the time-ordered operation on the received messages in an order based on an absolute time of entry into the region, wherein the absolute time of entry is relative to the reference clock and is determined based on the timestamp from the gateway.

2. The computer-implemented method of claim 1, wherein the time-ordered operation is performed on the received messages in a chronological order of the absolute time of entry of the messages.

3. The computer-implemented method of claim 1, wherein the time-ordered operation is performed on the received messages in an order based on the absolute time of entry but not strictly in a chronological order of the absolute time of entry.

4. The computer-implemented method of claim 1, wherein the time-ordered operation is performed on the received messages in an order that is also based on the gateway through which the message entered the region.

5. The computer-implemented method of claim 1, wherein if the time-ordered operation is performed on a message, that message must have entered the region through one of the gateways.

6. The computer-implemented method of claim 1, further comprising:
   buffering the received messages so that the time-ordered operation may be performed in order without missing any messages.

7. The computer-implemented method of claim 1, wherein the gateways are synchronized to within an order of nanoseconds of the reference clock.

8. The computer-implemented method of claim 1, wherein the gateways are guaranteed to be synchronized to within a known time deviation from the reference clock.

9. The computer-implemented method of claim 1, wherein synchronizing the gateways comprises, for at least one of the gateways:
   correcting a local clock of the gateway to match the reference clock, whereby the timestamp from the gateway shows the absolute time of entry.

10. The computer-implemented method of claim 1, wherein synchronizing the gateways comprises, for at least one of the gateways:
    determining an offset between a local clock of the gateway and the reference clock; and
    correcting the timestamp from the gateway according to the offset.

11. The computer-implemented method of claim 1, wherein estimating the offset between the pair of machines is based on the transit times of coded probes, wherein coded probes are pairs of probes transmitted from one of the machines in the pair to the other of the machines in the pair, the transmit timestamps of the pair of probes are within a predetermined time interval of each other, and the transit times of the pair of probes are also within a predetermined deviation of each other.

12. The computer-implemented method of claim 1, wherein the software-based synchronization process further comprises:
    for different pairs of machines, estimating a drift between the pair of machines based on the transit times of probes exchanged between the pair of machines; and
    estimated absolute drifts of the machines based on the estimated drifts between pairs of machines, wherein the absolute drift of a machine is defined relative to the reference clock.

13. The computer-implemented method of claim 1, wherein the software-based synchronization process further comprises:
    adjusting a frequency of a local clock for at least one of the gateways to match the reference clock.

14. A computer-implemented method for performing a time-ordered operation on messages transmitted from multiple sources, the method comprising:
    for each of two or more regions of networked machines:
       running a software-based synchronization process to synchronize each of a plurality of gateways with a reference clock, wherein each gateway is a machine on a perimeter of that region of networked machines and connected to receive messages from multiple transmitting machines; and receiving messages that enter that region through one of the gateways, wherein the gateway timestamps the message; and performing the time-ordered operation on the received messages in an order based on absolute times of entry into the regions, wherein the absolute time of entry into one of the regions is relative to the reference clock for that region and is determined based on the timestamps from the gateways for that region, and wherein the software-based synchronization process comprises:

exchanging probes between pairs of machines, wherein the machines exchanging probes include the gateways, for different pairs of machines, estimating an offset between the pair of machines based on the transit times of probes exchanged between the pair of machines; wherein the transit time is based on a transmit timestamp from the machine transmitting the probe and a receive timestamp from the machine receiving the probe, and one of the machines produces timestamps based on the reference clock, for different loops of at least three machines, calculating a loop offset error based on a sum of the estimated offsets between pairs of machines around the loop, and adjusting estimated absolute offsets of the machines based on the loop offset errors, wherein the absolute offset of a machine is defined relative to the reference clock.

15. The computer-implemented method of claim 14, wherein all of the regions use the same reference clock.

16. The computer-implemented method of claim 14, wherein at least two of the regions use different reference clocks.

17. The computer-implemented method of claim 14, wherein the perimeter for one of the regions lies entirely inside the perimeter of another of the regions.

18. The computer-implemented method of claim 14, wherein the perimeter for one of the regions lies partially inside the perimeter of another of the regions.

19. A computer system for performing a time-ordered operation on messages received from multiple sources, the computer system comprising:

a region of networked machines that includes a plurality of gateways, wherein each gateway is a machine on a perimeter of the region of networked machines and is connected to receive messages from multiple sources;

a coordinator that runs a software-based synchronization process to synchronize each of the gateways with a reference clock, wherein messages from the sources enter the region through the gateways and the gateways timestamp the entering messages, and wherein the software-based synchronization process comprises:

exchanging probes between pairs of machines, wherein the machines exchanging probes include the gateways, for different pairs of machines, estimating an offset between the pair of machines based on the transit times of probes exchanged between the pair of machines; wherein the transit time is based on a transmit timestamp from the machine transmitting the probe and a receive timestamp from the machine receiving the probe, and one of the machines produces timestamps based on the reference clock, for different loops of at least three machines, calculating a loop offset error based on a sum of the estimated offsets between pairs of machines around the loop, and adjusting estimated absolute offsets of the machines based on the loop offset errors, wherein the absolute offset of a machine is defined relative to the reference clock; and a subsystem that performs the time-ordered operation on the received messages in an order based on an absolute time of entry into the region, wherein the absolute time of entry is relative to the reference clock and is determined based on the timestamp from the gateway.

\* \* \* \* \*